United States Patent
Nishikawa et al.

(10) Patent No.: US 10,069,448 B2
(45) Date of Patent: Sep. 4, 2018

(54) HVAC ACTUATOR

(71) Applicant: DENSO International America, Inc., Southfield, MI (US)

(72) Inventors: Katsumi Nishikawa, West Bloomfield, MI (US); Young Kwon Lee, Canton, MI (US); Matt Porter, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/618,555

(22) Filed: Jun. 9, 2017

(65) Prior Publication Data

US 2017/0356667 A1    Dec. 14, 2017

Related U.S. Application Data

(60) Provisional application No. 62/348,377, filed on Jun. 10, 2016.

(51) Int. Cl.
| | |
|---|---|
| *H02P 7/00* | (2016.01) |
| *F24F 13/14* | (2006.01) |
| *H02K 7/116* | (2006.01) |
| *F24F 11/30* | (2018.01) |
| *H02K 11/225* | (2016.01) |
| *F24F 110/00* | (2018.01) |
| *F24F 140/40* | (2018.01) |

(52) U.S. Cl.
CPC ............ *H02P 7/0094* (2013.01); *F24F 11/30* (2018.01); *F24F 13/1426* (2013.01); *H02K 7/116* (2013.01); *H02K 7/1166* (2013.01); *H02K 11/225* (2016.01); *F24F 2013/1433* (2013.01); *F24F 2110/00* (2018.01); *F24F 2140/40* (2018.01)

(58) Field of Classification Search
CPC ................. F24F 11/001; F24F 13/1426; F24F 2011/0056; H24F 2013/1433; H02K 7/116; H02P 7/0094
USPC ......................................... 318/603, 600, 560
See application file for complete search history.

(56) References Cited

U.S. PATENT DOCUMENTS

| | | | | |
|---|---|---|---|---|
| 4,004,167 A | * | 1/1977 | Meckling | H01F 13/003 310/152 |
| 4,023,057 A | * | 5/1977 | Meckling | H02K 1/17 310/154.07 |
| 4,250,128 A | * | 2/1981 | Meckling | C04B 35/26 264/108 |
| 4,338,552 A | * | 7/1982 | Pilz | H02H 7/0851 318/266 |
| 4,763,347 A | * | 8/1988 | Erdman | H02P 6/182 318/400.21 |
| 5,103,147 A | | 4/1992 | Samann | |

(Continued)

*Primary Examiner* — David S Luo
(74) *Attorney, Agent, or Firm* — Harness, Dickey & Pierce, P.L.C.

(57) ABSTRACT

A heating, ventilation, and air conditioning (HVAC) system actuator including a stator magnet and a rotor magnet. The rotor magnet turns an axle connected to an airflow door such that rotation of the axle moves the door and generates waveforms. The number of waveforms generated corresponds to how much the axle has rotated. The stator magnet is magnetized to a saturated state, thereby providing the waveforms with a consistent shape that is consistently detectable by a climate control pulse count module.

18 Claims, 3 Drawing Sheets

(56) References Cited

U.S. PATENT DOCUMENTS

| | | | | |
|---|---|---|---|---|
| 5,111,095 A * | 5/1992 | Hendershot | .......... | H02K 19/103 174/DIG. 19 |
| 5,604,672 A | 2/1997 | Yoshida et al. | | |
| 5,653,386 A * | 8/1997 | Hennessee | ......... | B60H 1/00735 237/12.3 B |
| 6,002,234 A | 12/1999 | Ohm et al. | | |
| 6,034,464 A * | 3/2000 | Asao | .................... | H02K 21/044 310/181 |
| 6,653,829 B1 * | 11/2003 | Henry | .................. | G01D 5/2451 324/207.21 |
| 6,812,608 B2 * | 11/2004 | Nakazawa | ............. | H02K 23/04 310/154.03 |
| 6,861,775 B2 * | 3/2005 | Lau | ........................ | H02K 23/66 310/68 B |
| 7,038,343 B2 * | 5/2006 | Agnes | ..................... | H02K 1/17 29/596 |
| 7,202,622 B2 * | 4/2007 | Eskritt | .................. | B62D 5/065 318/400.24 |
| 7,352,145 B2 * | 4/2008 | Moller | ..................... | H02P 5/68 318/254.1 |
| 2002/0140290 A1 | 10/2002 | Goto et al. | | |
| 2005/0040782 A1 * | 2/2005 | Jasinski | ............. | B60H 1/00835 318/446 |
| 2007/0013252 A1 * | 1/2007 | Yokota | .................... | H02K 1/17 310/154.08 |
| 2007/0075656 A1 * | 4/2007 | Moller | ..................... | H02P 5/68 318/77 |
| 2008/0298784 A1 * | 12/2008 | Kastner | ................... | G01P 3/44 388/811 |
| 2009/0272562 A1 | 11/2009 | Yoshioka et al. | | |
| 2014/0000861 A1 * | 1/2014 | Barrett | ............... | B60H 1/00871 165/208 |
| 2015/0084445 A1 * | 3/2015 | DeFilippis | ............... | H02K 1/04 310/43 |
| 2015/0204393 A1 | 7/2015 | Holmes | | |
| 2016/0195287 A1 * | 7/2016 | Shirali | .................. | A47J 39/006 700/282 |
| 2016/0218586 A1 * | 7/2016 | Li | .......................... | H02K 23/40 |

* cited by examiner

HVAC ACTUATOR

CROSS-REFERENCE TO RELATED APPLICATIONS

This application claims the benefit of U.S. Provisional Application No. 62/348,377, filed on Jun. 10, 2016. The entire disclosure of the above application is incorporated herein by reference.

FIELD

The present disclosure relates to a heating, ventilation, and air conditioning (HVAC) system actuator that generates consistent current pulse waveforms that are regularly detectable by a pulse count module.

BACKGROUND

This section provides background information related to the present disclosure, which is not necessarily prior art.

With reference to prior art FIG. 1, heating, ventilation, and air conditioning (HVAC) systems typically include an actuator 12 (i.e., actuator motor/DC motor), which turns an axle or shaft 50. The axle 50 rotates a gear train 28. Connected to the gear train 28 is an HVAC airflow control door 22, which is moved to control airflow. The actuator 12 generates current pulse waveforms as the actuator 12 rotates the axle 50. The number of current pulse waveforms generated corresponds to how much the axle 50 has rotated. Thus by counting the number of current pulse waveforms generated, a climate control module of the HVAC system is able to determine how much the axle 50 has rotated, and how far airflow control door 22 coupled to the axle 50 has moved in order to determine the position of the airflow control door 22.

While existing HVAC actuators are suitable for their intended use, they are subject to improvement. For example, existing HVAC actuators generate inconsistent current pulse waveforms that are difficult for climate control modules to regularly detect. As a result, one or more current pulse waveforms often go undetected, which results in the climate control module being unable to accurately determine the actual position of the airflow control door, and typically leads to the climate control module generating a diagnostic trouble code.

Prior art FIG. 2 illustrates a plurality of current pulse waveforms 10A-10F generated by existing actuators. The current pulse waveforms 10A-10F are inconsistent in at least their shape (i.e., voltage), which makes it difficult for a climate control module to detect the waveforms 10A-10F. It would therefore be desirable to have an airflow control door that generates current pulse waveforms that can be detected by a climate control module on a consistent basis so that the climate control module will be able to determine position of the airflow control door more precisely. The present teachings successfully overcome these issues in the art, as well as numerous others.

SUMMARY

This section provides a general summary of the disclosure, and is not a comprehensive disclosure of its full scope or all of its features.

The present teachings provide for an actuator for a heating, ventilation, and air conditioning (HVAC) system. The actuator includes a magnet magnetized to saturation, which results in the actuator producing a consistent waveform in response to rotation of the actuator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 3:
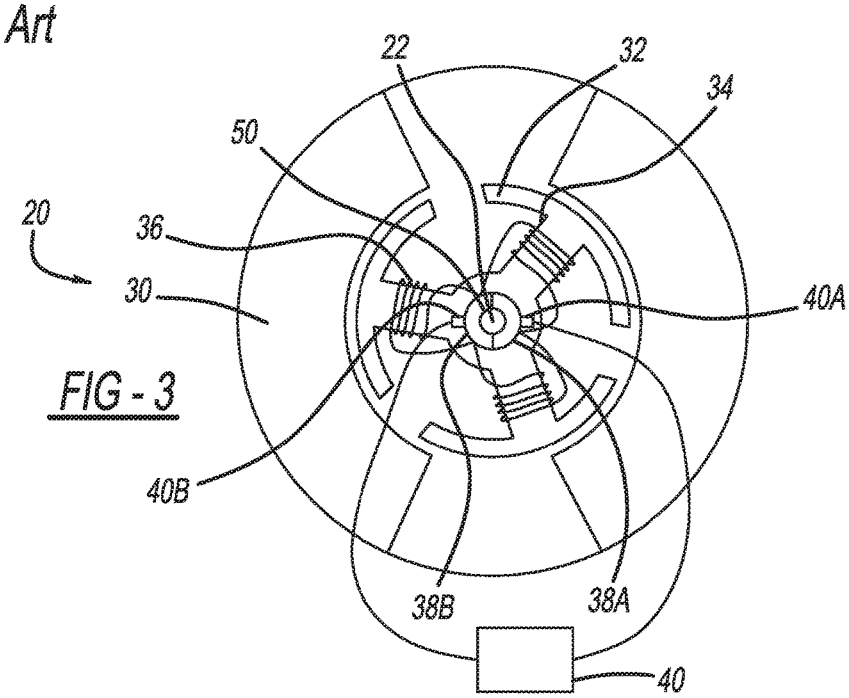
FIG. 3 illustrates an actuator according to the present teachings for actuating an airflow control door of an HVAC system.
Figure 5:
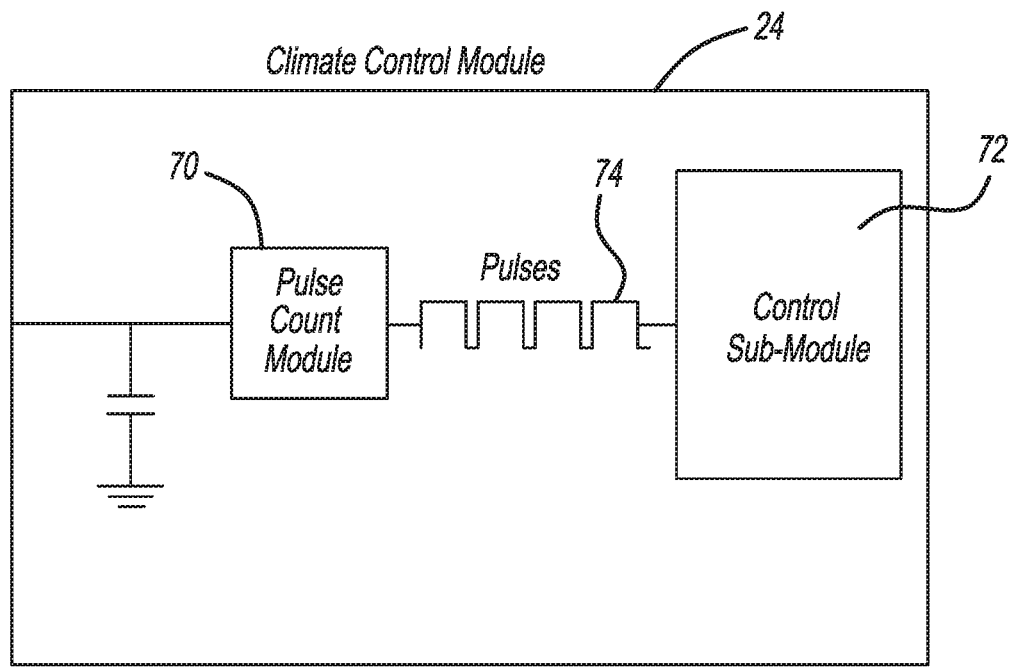
FIG. 5 illustrates a climate control module that counts the current pulse waveforms generated by the actuator of FIG. 3 and determines position of the airflow control door based on the number of current pulse waveforms counted.

FIG. 3 illustrates an exemplary actuator 20 in accordance with the present teachings. The actuator 20 can be any suitable electric motor capable of actuating or otherwise moving HVAC airflow control door 22, which is configured to direct airflow to a desired location. The actuator 20, the HVAC airflow control door 22, and climate control module 24 of FIG. 5 provide a heating, ventilation, and air conditioning (HVAC) system according to the present teachings.

In the example of FIG. 3, the actuator 20 can be a DC motor, for example. The actuator 20 generally includes a stator magnet 30, also known as a field magnet and a permanent magnet. The stator magnet 30 can be made of any suitable material, and can include rubber, for example. The stator magnet 30 has a North pole and a South pole, which are on opposite sides of a rotor magnet 32. The rotor magnet 32 includes an armature 34 with coils 36 wrapped thereon. The actuator 20 includes a plurality of armatures 34, each having coils 36, but only a single armature 34 is illustrated for clarity. The coils 36 are connected to commutator rings 38A and 38B. Brushes 40A and 40B are in electrical contact with commutator rings 38A and 38B respectively. A battery 40 is connected to the brushes 40A and 40B to supply current to the commutators 38A and 38B, and ultimately to the coils 36. As is known in the art, supplying current to the coils 36 results in an electromagnetic force being induced on the rotor magnet 32, which causes the rotor magnet 32 to rotate in either a clockwise or a counterclockwise direction relative to the orientation of FIG. 3.

Figure 1:
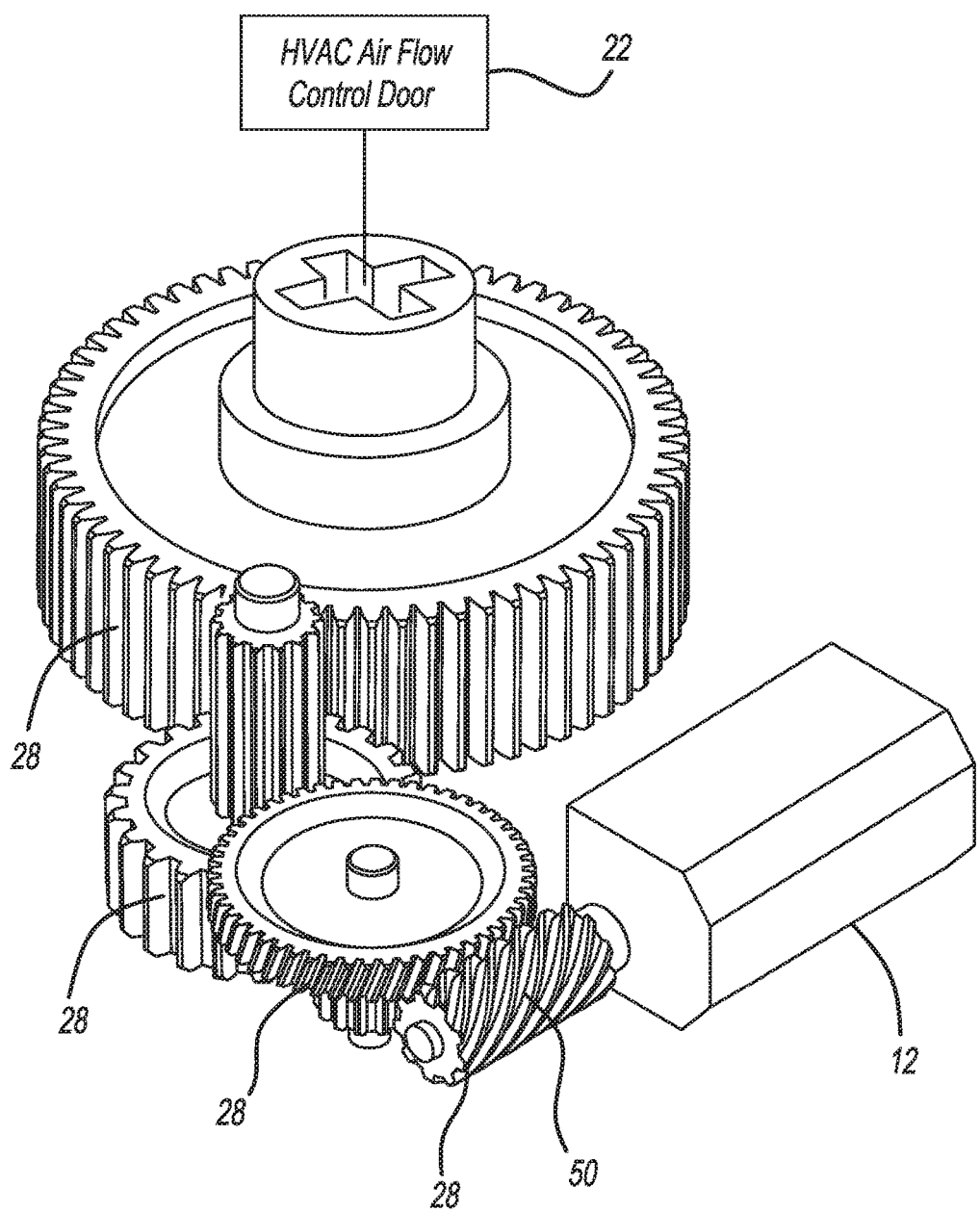
FIG. 1 illustrates an exemplary prior art actuator, gear train, and HVAC air flow control door.

The commutators 38A and 38B are mounted to an axle 50. Thus rotation of the rotor magnet 32, which includes rotation of the commutators 38A and 38B, rotates the axle 50. The axle 50 is connected to the HVAC airflow control door 22 in a manner suitable to actuate, or otherwise move, the HVAC airflow control door 22 so as to direct airflow to a desired location. The axle 50 can be connected to the HVAC airflow control door 22 directly or indirectly, such as by way of the gear train 28 of FIG. 1.

Figure 6:
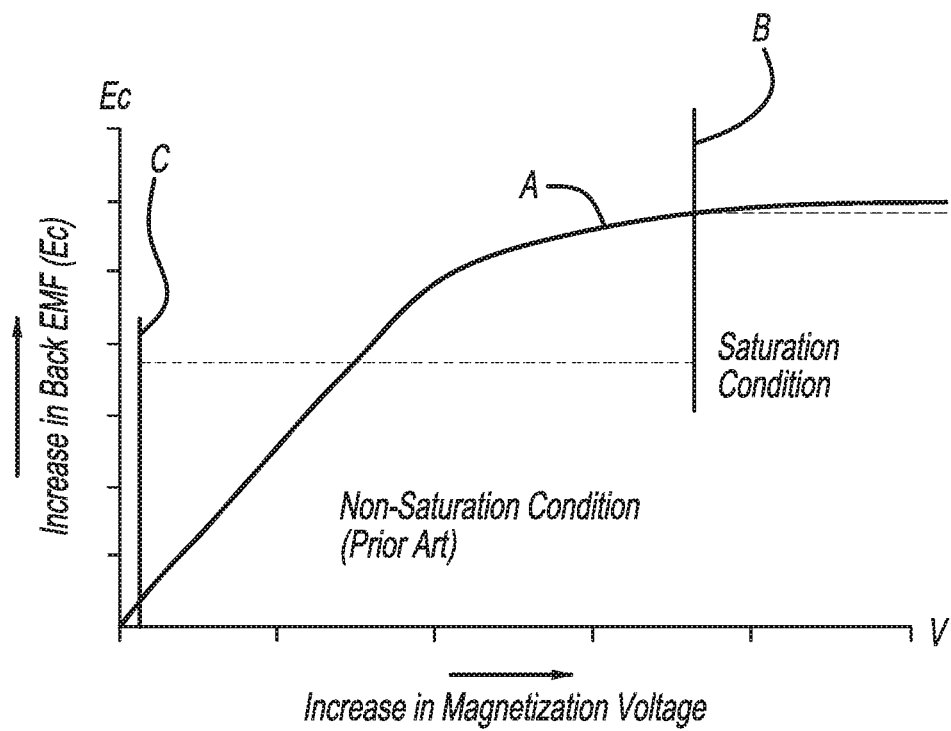
FIG. 6 graphically illustrates a saturated state of a magnet of the actuator of FIG. 3 as compared to a magnet of a prior art actuator that is not in a saturated state.

The stator magnet 30 is magnetized to saturation, which is in contrast to stator magnets of existing HVAC motors. Magnetic saturation is the state reached when an increase in applied external magnetic field cannot increase the magnetization of the stator magnet 30 further. With reference to FIG. 6, for example, an exemplary magnetization curve for the exemplary stator magnet 30 is illustrated at A. The stator magnet 30 is magnetized with a voltage in the range of area B, which is any voltage suitable to magnetize the stator magnet 30 in a state of saturation. The amount of voltage required to magnetize the stator magnet 30 to a saturation state varies depending on various factors, such as the thickness of the stator magnet 30. For an exemplary stator magnet 30, the voltage required to magnetize the stator magnet 30 to a saturation state is 1,450 volts, or about 1,450 volts. The voltage required to place the stator magnet 30 in a saturation state is greater than the voltage used to magnetize existing stator magnets, which is represented at area C of FIG. 6. FIG. 6 also illustrates that the counter-electromotive force (back EMF) is greater for the stator magnet 30 according to the present teachings in the saturation state as compared to existing stator magnets, which are magnetized to a non-saturation condition. Magnetizing the stator magnet 30 to the saturation state also advantageously increases the speed and torque of the actuator 20.

Figure 4:
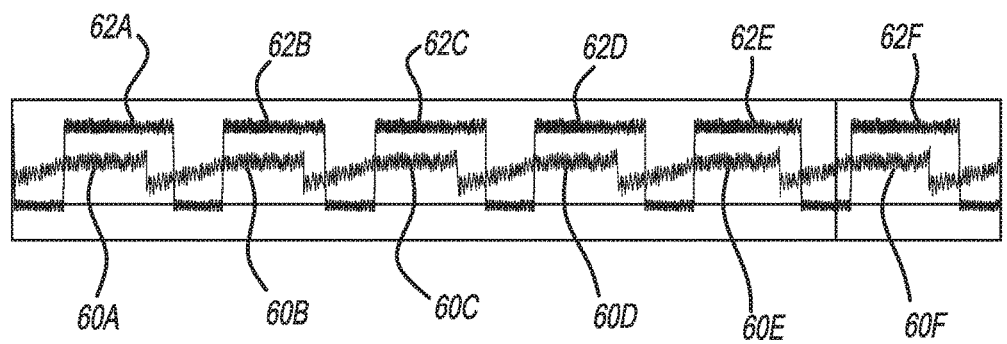
FIG. 4 illustrates exemplary current pulse waveforms generated in response to rotation of the actuator of FIG. 3.

With reference to FIG. 4, as the rotor magnet 32 rotates, the actuator 20 generates a plurality of current pulse waveforms at regular intervals. The number of current pulse waveforms generated corresponds to how much the axle 50 has been rotated. The actuator 20 can be configured to generate any suitable number of current pulse waveforms per complete rotation of the axle 50. In one example, the rotor magnet 32 is configured to generate six current pulse waveforms 60A, 60B, 60C, 60D, 60E, and 60F for each complete rotation of the axle 50. The number of current pulse waveforms depends on the number of commutator segments and brushes. DC motors typically have three communicator segments and two brushes, which results in six current pulse waveforms.

Figure 2:
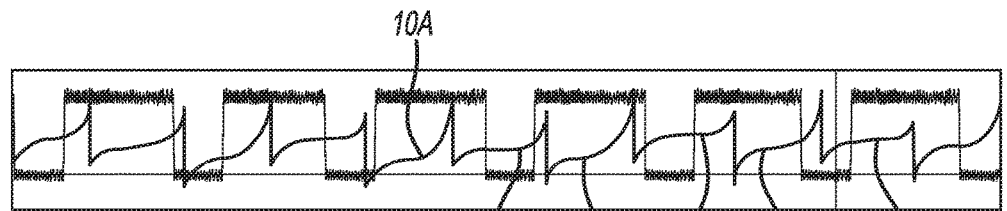
FIG. 2 illustrates a plurality of current pulse waveforms generated by a prior art actuator for actuating airflow control doors of an HVAC system.

FIG. 4 illustrates exemplary current pulse waveforms of the actuator 20 at reference numerals 62A-62F. As a result of the stator magnet 30 being magnetized to a saturation state, each one of the current pulse waveforms 60A-60F is consistent, uniform, and generally the same, which is in contrast to the current pulse waveforms 10A-10F illustrated in FIG. 2. The waveforms 10A-10F are generated by an existing motor with a stator magnet magnetized to a non-saturation state. The current pulse waveforms 60A-60F generated by the stator magnet 30 according to the present teachings in the saturation state are consistently detected by the climate control module 24, and thus the climate control module 24 is able to accurately identify the position of the HVAC airflow control door 22.

The current pulse waveforms 60A-60F are illustrated for exemplary purposes only. The exact shape of the current pulse waveforms 60A-60F may vary based on the type and size of the stator magnet 30 in the saturated state. But regardless of the type and size of the stator magnet 30, the current pulse waveforms generated will be consistent, uniform, and generally the same as a result of the stator magnet 30 being magnetized to a saturation state in accordance with the present teachings.

The climate control module 24 can be any suitable climate control module configured to count the number of current pulse waveforms, such as current pulse waveforms 60A-60F, generated by the stator magnet 30. For example, the climate control module 24 can be. The climate control module 24 generally includes a pulse count module 70 and a sub-control module 72. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The climate control module 24 is in communication with the actuator 20 in any suitable manner so that the current pulse waveforms, such as the waveforms 60A-60F, are input to the climate control module 24 (and specifically to the pulse count module 70 thereof). The pulse count module 70 generates electric pulses 74 in response to receipt of the current pulse waveforms 60A-60F. The pulse count module 70 can generate the pulses 74 at any suitable ratio relative to the number of current pulse waveforms 60A-60F received. For example, the pulse count module 70 can be configured to generate one pulse 74 for each current pulse waveform 60A-60F received. Detection of the current pulse waveforms 60A-60F by the pulse count module 70 is facilitated by the current pulse waveforms 60A-60F being consistent, which is in contrast to the prior art waveforms 10A-10F of FIG. 2 generated by motors with stator magnets in a non-saturation condition. The sub-control module 72 receives the pulses 74 generated by the pulse count module 70, and determines the location (or expected location) of the HVAC airflow control door 22 based on the number of pulses 74 received.

The climate control module 24 includes, or is in communication with, any suitable input devices for receiving climate control inputs from a user, such as any suitable knob, button, touch surface, etc. Using these inputs, the user can input any suitable HVAC commands, including a desired airflow setting, such as a face mode, foot mode, bi-level mode, defrost mode, etc. The climate control module 24 is configured to operate the actuator 20 to turn the axle 50 a required distance and direction to place the HVAC airflow control door 22 in the proper position corresponding to the airflow mode selected. The sub-control module 72 is configured to know how many pulses 74 should be generated by the pulse count module 70 (in response to the number of current pulse waveforms 60A-60F received), in order to place the HVAC airflow control door 22 in the requested position. If the sub-control module 72 receives less than the proper number of pulses 74 (or greater than the proper number of pulses 74) then the sub-control module 72 determines that the HVAC airflow control door 22 is not in the proper position and triggers a diagnostic trouble code (DTC). For example, if a user selects a foot airflow mode, and the sub-control module 72 knows that 90 pulses 74 should be generated by the pulse count module 70 as the HVAC airflow control door 22 moves to the proper position for the foot airflow mode, the climate control module 24 will operate the actuator 20 to rotate the axle 50 until 90 pulses are received. If 90 pulses are not received, such as because the control door 22 hits a hard stop, the sub-control module 72 will trigger a DTC error. During a calibration cycle (i.e., learning total number of current pulse waveforms for end to end travel of door 22 in clockwise and counter-clockwise directions), if learned number of current pulse waveforms is less than preset limits then a diagnostic trouble code will be triggered.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) system comprising:
    an actuator including a stator magnet and a rotor magnet that turns an axle connected to an airflow door by way of a gear train such that rotation of the axle moves the door and generates current pulse waveforms, the number of current pulse waveforms generated corresponds to how much the axle rotates, the stator magnet is magnetized to a saturated state thereby providing the current pulse waveforms with a consistent shape that is consistently detectable by a climate control pulse count module.

2. The HVAC system of claim 1, wherein the actuator is an HVAC airflow door actuator.

3. The HVAC system of claim 2, wherein the actuator is a DC motor.

4. The HVAC system of claim 1, wherein the stator magnet includes rubber.

5. The HVAC system of claim 1, wherein the current pulse waveforms gradually increase in intensity.

6. The HVAC system of claim 1, further comprising a climate control module including the climate control pulse count module and a control sub-module;
    wherein the pulse count module generates pulses corresponding to the number of current pulse waveforms received by the pulse count module, and outputs the pulses to the control sub-module.

7. The HVAC system of claim 6, wherein the control sub-module identifies position of the airflow door based on the number of pulses received from the pulse count module.

8. The HVAC system of claim 1, wherein the stator magnet is magnetized to a saturation condition of about 1,450 volts.

9. A heating, ventilation, and air conditioning (HVAC) system comprising:
  an actuator including a magnet magnetized to saturation, an axle of the actuator is connected to an airflow door such that rotation of the axle moves the airflow door and generates current pulse waveforms with a consistent shape that is consistently detectable by a climate control pulse count module, the number of current pulse waveforms generated corresponds to how much the axle rotates.

10. The HVAC system of claim 9, further comprising a climate control module including the climate control pulse count module and a control sub-module;
  wherein the pulse count module generates pulses corresponding to the number of current pulse waveforms received by the pulse count module, and outputs the pulses to the control sub-module; and
  wherein the control sub-module identifies position of the airflow door based on the number of pulses received from the pulse count module.

11. The HVAC system of claim 9, wherein the magnet is a stationary field magnet; and
  wherein the actuator further comprises a rotatable armature magnet that rotates the axle.

12. The HVAC system of claim 11, wherein the stationary field magnet includes rubber.

13. An actuator for a heating, ventilation, and air conditioning (HVAC) system, the actuator comprising:
  a magnet magnetized to saturation; and
  an axle, rotation of the axle moves airflow control doors connected to the axle;
  wherein in response to rotation of the axle the actuator generates current pulse waveforms, the number of current pulse waveforms generated corresponds to how much the axle has rotated, the current pulse waveforms have a consistent shape that is regularly detectable by a climate control pulse count module.

14. The actuator of claim 13, wherein each one of the current pulse waveforms gradually increases in voltage.

15. The actuator of claim 13, wherein the actuator is a DC actuator motor.

16. The actuator of claim 13, further comprising a climate control module including the climate control pulse count module and a control sub-module;
  wherein the climate control pulse count module generates pulses corresponding to the number of current pulse waveforms received by the climate control pulse count module, and outputs the pulses to the control sub-module.

17. The actuator of claim 16, wherein the control sub-module identifies position of the airflow door based on the number of pulses received from the pulse count module.

18. The actuator of claim 13, wherein the magnet is magnetized with about 1,450 volts.

* * * * *